(12) United States Patent
Pereira et al.

(10) Patent No.: US 7,406,992 B2
(45) Date of Patent: Aug. 5, 2008

(54) TIRE WITH LOW ZONE COMPRISING A CONCENTRATION OF CORDS

(75) Inventors: Pedro Costa Pereira, Clermont-Ferrand (FR); Bernard Guerinon, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 229 days.

(21) Appl. No.: 11/281,340

(22) Filed: Nov. 18, 2005

(65) Prior Publication Data

US 2006/0070693 A1   Apr. 6, 2006

Related U.S. Application Data

(60) Division of application No. 10/146,010, filed on May 15, 2002, now Pat. No. 6,973,950, which is a continuation of application No. PCT/EP00/11190, filed on Nov. 13, 2000.

(30) Foreign Application Priority Data

Nov. 18, 1999   (FR)   ..................... 99 14621

(51) Int. Cl.
*B60C 15/00* (2006.01)
*B60C 15/02* (2006.01)
*B60C 15/06* (2006.01)

(52) U.S. Cl. ................. 152/543; 152/539; 152/547; 152/550; 152/564

(58) Field of Classification Search ............. 152/539, 152/542, 543, 545, 547, 550, 552, 564
See application file for complete search history.

(56) References Cited

U.S. PATENT DOCUMENTS

| | | | |
|---|---|---|---|
| 3,072,171 A | 1/1963 | Drakeford et al. |
| 3,547,178 A | 12/1970 | Boileau |
| 4,580,610 A | 4/1986 | Jackson |
| 5,660,656 A | 8/1997 | Herbelleau et al. |
| 5,849,117 A | 12/1998 | Billieres |
| 6,523,591 B1 | 2/2003 | Billieres et al. |
| 6,659,149 B2 | 12/2003 | Pereira et al. |
| 6,814,119 B2 | 11/2004 | Caretta et al. |
| 2003/0150540 A1 | 8/2003 | Herbelleau et al. |
| 2003/0150541 A1 | 8/2003 | Herbelleau et al. |
| 2003/0150542 A1 | 8/2003 | Herbelleau et al. |
| 2003/0155061 A1 | 8/2003 | Herbelleau et al. |

FOREIGN PATENT DOCUMENTS

| | | |
|---|---|---|
| EP | 0 582 196 | 2/1994 |
| FR | 2 771 050 | 5/1999 |
| WO | WO 82/04225 | 12/1982 |

*Primary Examiner*—Adrienne C Johnstone
(74) *Attorney, Agent, or Firm*—Buchanan Ingersoll & Rooney PC

(57) ABSTRACT

A tire comprising at least one reinforcement structure of the carcass type anchored on either side of the tire in a bead, the base of which bead is intended to be mounted on a rim seat, the reinforcement structure extending circumferentially from the bead towards the sidewall, at least one arrangement of main cords along a substantially circumferential path being arranged substantially adjacent to the structure, the arrangement of the cords of the at least one arrangement being such that the number of main cords arranged on the axially inner side relative to the structure is greater than the number of main cords arranged on the axially outer side relative to the structure.

11 Claims, 7 Drawing Sheets

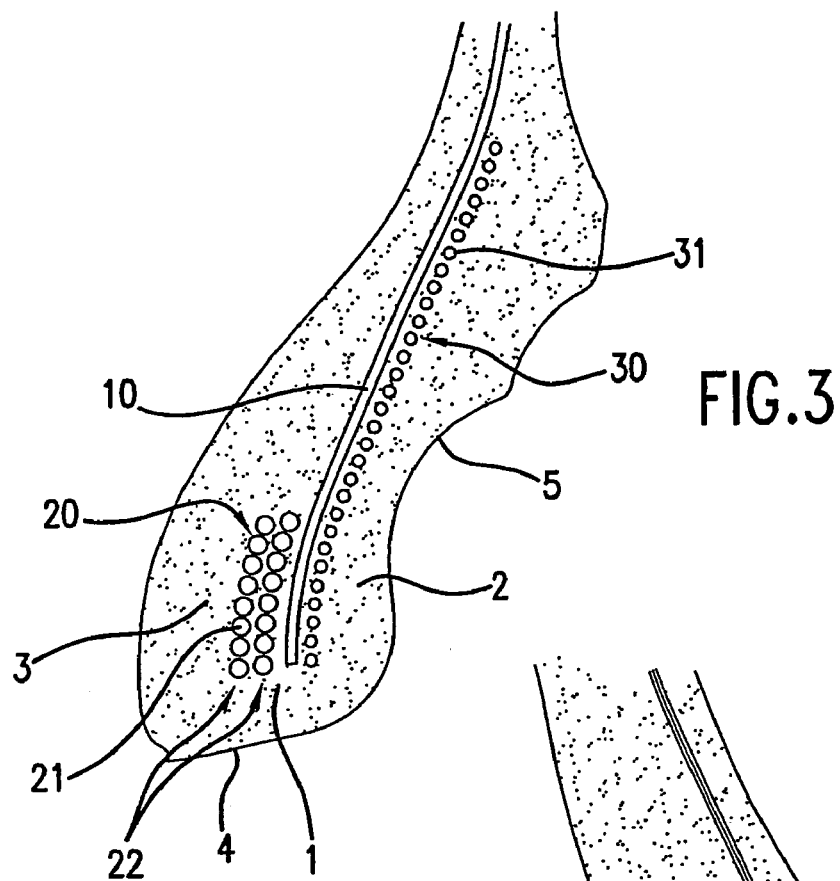
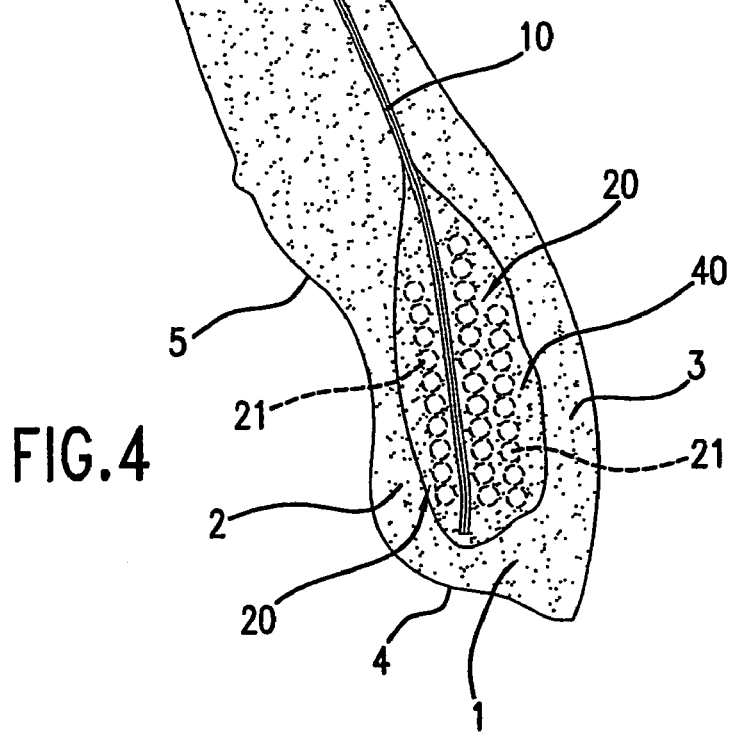

TIRE WITH LOW ZONE COMPRISING A CONCENTRATION OF CORDS

CROSS REFERENCE TO RELATED APPLICATIONS

This is a divisional application of U.S. Ser. No. 10/146,010 filed on May 15, 2002, now U.S. Pat. No. 6,973,950 issued on Dec. 13, 2005, which, in turn, is a continuation of international application PCT/EP 00/11190 filed Nov. 13, 2000, published in French on May 25, 2001 as international publication WO 01/36219 A1

BACKGROUND OF THE INVENTION

1. Technical Field of the Invention

The present invention relates to tires. More particularly, it relates to the arrangement of the reinforcement cords in the sidewalls and in the beads. It also relates to the anchoring of the carcass cords in the bead and the reinforcements of different portions of the bead or the sidewall.

2. The Related Art

The carcass reinforcement of tires is at present formed by one or more plies, most frequently radial plies, which are turned up about one or more bead wires arranged in the beads. The beads constitute the means which makes it possible to fix the tire on the rim. The rigidity of the bead thus formed is very great.

For some specific applications, in which the tire may, for example, be subjected to greater loads or to more violent impacts, etc., it may prove desirable to be able to refine some characteristics such as rigidity, impact strength, etc. Furthermore, in order to facilitate automation of certain steps of the tire manufacturing process, it may prove advantageous to revise the nature and/or the arrangement of some of the constituent elements.

In the current art, it is quite difficult to ensure modulation of the characteristics of the sidewall and/or of the bead. The sidewall must have great flexibility, and the bead, in contrast, must have great rigidity. Furthermore, the reinforcements which are arranged in this part of the tire always inevitably have a discontinuity: at the level of the radially upper end of the carcass upturn, there is passage without transition into a zone devoid of the carcass upturn, which zone is therefore inevitably less rigid.

As a reminder, "radially upwards" or "radially upper" means towards the largest radii. In the case of radial carcasses, other principles of design are already known which make it possible to avoid upturns about a bead wire. By way of example, reference may be made to U.S. Pat. No. 3,072,171, in which it was proposed to dispense with the upturn of the carcass plies and to arrange cords oriented circumferentially. In this known structure, however, it is difficult to ensure sufficiently strong anchoring of the carcass cords to the cords which are oriented circumferentially, which means that this proposal has never been applied in practice.

Furthermore, there is known from EP 0 582 196 a method of arranging the reinforcements of the carcass ply in the beads, by arranging circumferential filaments adjacent to the reinforcements, the whole being embedded in a connecting rubber of high elasticity modulus. Several arrangements are proposed in this document. In all cases, there are more axially inner reinforcement cords relative to the reinforcement structure than there are axially outer cords.

SUMMARY OF THE INVENTION

A first object of the invention is to overcome the foregoing disadvantages of the prior art.

Another object of the invention is to propose a type of arrangement of the various constituent elements of a tire in order to be able to refine certain characteristics such as rigidity, impact resistance, etc.

Another object of the invention is to propose a tire reinforcement structure which lends itself readily to mechanised manufacture.

Another object of the invention is to propose a tire reinforcement structure which takes into account the different mechanical stresses occurring in the different zones of the beads during operation, in particular at rated pressure.

Another object of the invention is to propose an arrangement of the bottom zone of the tire which provides effective, durable anchoring of the reinforcement structure in the beads of the tire.

The foregoing objects are attained in accordance with the invention by providing a tire comprising at least one reinforcement structure of the carcass type anchored on either side of the tire in a bead, the base of which is intended to be mounted on a rim seat, each bead being extended radially towards the outside by a sidewall and comprising an axial bearing zone extending substantially between the base of the bead and a radial position of such bead substantially corresponding to the position of the radial edge of the hook of a rim for which the tire is adapted, the sidewalls radially towards the outside joining a tread, on the circumference of the tire the reinforcement structure extending from an end portion of the structure, arranged in the bead, towards the sidewall, at least one arrangement of main cords along a substantially circumferential path being arranged substantially adjacent to the end portion so as to form an anchoring zone, the arrangement of the cords of the arrangements being such that the number of main cords arranged on the axially inner side relative to the structure is greater than the number of main cords arranged on the axially outer side relative to the structure, the main cords extending substantially radially to the inside of the axial bearing zone.

The comparisons are advantageously effected in the zone of the bead, namely, for example, from the seat to a zone located at the upper, or radially outer, level of the portion adapted to the rim hook. The cords located radially to the outside of this portion are not considered. The main cords are advantageously arranged such that their radial position does not extend beyond the outermost radial position of the hook of a rim on which the tire is to be mounted, so as to improve the contribution of the main cords to the endurance of the bottom zone.

Such an arrangement makes it possible to optimize the mechanical behavior of the bottom zone of the tire, in particular at the level of the bead. In fact, the stresses which act on either side of the reinforcement structure are generally not symmetrical. The present invention makes it possible better to make allowance for these conditions. Thus, for example, the main cords are advantageously greater in number in a zone liable to be subjected to great tensile stresses at rated pressure and during travel, and advantageously fewer in number, or even absent, in a zone liable to be subjected to great compressive stresses. Such an arrangement may contribute to reducing the tendency of the bead to overturn.

It has been noted that the stresses which act on either side of the reinforcement structure are not symmetrical. According to the invention, the bead is designed so as to optimize the behavior of the bottom zone of the tire, according to these different stresses.

In fact, the compressive stresses are well supported and well distributed in a homogenous zone. As for the tensile forces, they are dampened by the presence of the cords, which thus contributes to optimizing the mechanical behavior of a highly stressed zone.

Preferably, it is desired to counter the effect of rotation, in order to promote the holding in place of the bead.

The main cords are the cords which participate in the function of anchoring the carcass-type reinforcement structure in the bead and/or of clamping the bead, so that, without these cords, the function of anchoring and/or clamping could not be guaranteed, or even assured.

Thus, the main cords are advantageously of the metallic type. The main cords advantageously have a high elastic modulus and are advantageously continuous. These cords preferably have a high initial modulus.

The secondary cords are the cords which do not participate substantially or in a determining manner in the function of anchoring the carcass-type reinforcement structure in the bead and/or of clamping the bead, so that, without these cords, the function of anchoring and/or of clamping could not be seriously affected, or would continue to be ensured by the main cords.

Thus, the secondary cords are advantageously of the textile type. The secondary cords advantageously have a lower elastic modulus than that of the main cords.

According to this first aspect of the invention, the secondary cords are not included in the comparison of the numbers of cords.

According to an advantageous variant, all the arrangements of main cords are on the axially inner side relative to the structure.

According to another advantageous variant, the tire also comprises at least one arrangement of secondary cords which are arranged axially to the outside relative to said reinforcement structure.

The secondary cords contribute to optimizing the lateral rigidity of the tire, in particular above the rim hook, with the possibility of modulating the arrangements according to the specific characteristics for specific zones. For example, provision may be made for a single alignment of secondary cords on a portion of the bottom zone, and a double or even triple alignment on another portion where it is desired to increase the rigidity or to provide protection against potential impacts which might affect the integrity of the tire. Furthermore, the secondary cords may be provided so as to provide protection against wear at the interface with the rim.

The secondary cords are advantageously non-metallic, and preferably of the textile type.

The carcass-type reinforcement structure is preferably a single-cord structure.

Preferably, the cords and the portion of the structure in the immediate vicinity are embedded in a rubber mix of high modulus, for example a modulus greater than 25 MPa and preferably greater than 40 MPa.

According to an advantageous variant, the reinforcement structure comprises, at the level of the beads, two structure portions, with interposition of an arrangement of primary and/or secondary cords between the adjacent portions.

According to another advantageous variant, the reinforcement structure comprises, at the level of the beads, three or more structure portions, with interposition of an arrangement of primary and/or secondary cords between adjacent portions.

Advantageously, a zone of rubber of high modulus is provided between adjacent portions of the structure.

Advantageously, the secondary cords are arranged so as to be in contact with at least one rubber mix of high modulus. It is also possible to provide for the arrangement to be surrounded on one side by a first mix and on the other side by a second mix.

According to an advantageous variant, that zone of the bead which is located axially to the inside is formed at least in part of a rubber mix of high modulus. The presence in this zone of a material of this type contributes to ensuring optimum behavior of the bottom zone of the tire. In fact, such a material provides better resistance to tensile stresses.

According to an advantageous variant, that zone of the bead which is located axially to the outside is formed at least in part of a rubber mix of low modulus. The presence in this zone of a material of this type contributes to ensuring optimum behavior of the bottom zone of the tire.

According to another aspect of the invention, there is provided a tire comprising at least one reinforcement structure anchored on either side of the tire in a bead, the base of which is intended to be mounted on a rim seat, each bead being extended radially towards the outside by a sidewall and comprising a zone of axial bearing extending substantially between the base of the bead and a radial position of the bead substantially corresponding to the position of the radial edge of the hook of a rim for which the tire is adapted, the sidewalls radially towards the outside joining a tread, on the circumference of the tire the reinforcement structure extending from an end portion of the structure, arranged in the bead, towards the sidewall, at least in the end portion the structure being axially separated into at least two portions, at least one arrangement of main cords along a substantially circumferential path being arranged substantially adjacent to at least one of the portions of the structure so as to form an anchoring zone, the arrangement of the cords of the arrangements being such that the surface density of main cords which are arranged on the axially inner side relative to the structure is greater than the surface density of main cords arranged on the axially outer side relative to the structure, the main cords extending substantially radially to the inside of said zone of axial bearing.

In this context, where the reinforcement structure, at least at the level of the beads, is divided into several parts, the possible arrangements arranged between structure portions are not taken into account. Only the arrangements axially to the inside and axially to the outside of the structure are compared: the structure portions, with the possible intra-structure arrangements, are considered as a whole. Therefore, only the arrangements of main cords located on either side of the extreme structure portions are compared.

According to an advantageous variant, the reinforcement structure comprises, at the level of the bead, two structure portions, with the interposition of at least one arrangement of main and/or secondary cords between the adjacent portions.

According to another advantageous variant, the reinforcement structure comprises, at the level of the bead, three or more structure portions, with the interposition of at least one arrangement of main and/or secondary cords between adjacent portions.

Advantageously, a zone of rubber of high modulus is provided between adjacent portions of the structure.

According to an advantageous variant, all of the arrangements of main cords are on the axially inner side relative to said structure. Here again, this excludes the possible intra-structure arrangements.

According to another advantageous variant, the tire also comprises at least one arrangement of secondary cords which are arranged axially to the outside relative to the reinforcement structure.

The secondary cords are advantageously non-metallic, and preferably of the textile type.

The main cords advantageously have a high elastic modulus.

Advantageously, at least one portion of the main cords and the structure portion in the immediate vicinity of the main cords are embedded in a rubber mix of high modulus, namely, for example, a modulus greater than 25 MPa and preferably greater than 40 MPa.

Advantageously, the secondary cords are arranged so as to be in contact with at least one rubber mix of high modulus. It is also possible to provide for the arrangement to be surrounded on one side by a first mix and on the other side by a second mix.

"Secondary cord" is understood to mean a cord, the modulus of which is less than 20,000 daN/mm$^2$ and preferably less than 15,000 daN/mm$^2$. Advantageously, cords of textile type are used, such as cords based on aramid, aromatic polyester, or alternatively other types of cords having lower moduli, such as cords based on PET, rayon, etc.

Preferably, the circumferentially oriented cords are not in direct contact with the radially oriented cords. Advantageously, for tires which are subject to high stresses, in order to ensure good transmission of the forces between the portions of cords of the reinforcement structure and the circumferentially oriented cords, there is interposed a rubber of high elasticity modulus, that is to say, a rubber mix having a Shore A hardness greater than 70, between the circumferentially oriented cords and the adjacent alignment of carcass cords.

According to another aspect of the invention, there is provided a tire comprising at least one reinforcement structure of the carcass type anchored on either side of the tire in a bead, the base of which is intended to be mounted on a rim seat, each bead being extended radially towards the outside by a sidewall, the sidewalls radially towards the outside joining a tread, on the circumference of the tire the reinforcement structure extending from an end portion of the structure, arranged in the bead, towards the sidewall, at least one arrangement of cords along a substantially circumferential path being arranged substantially adjacent to the end portion, each cord arranged on the axially inner side relative to the structure having a Young's modulus $E_I$ and a surface $S_I$ and each cord arranged on the axially outer side relative to the structure having a Young's modulus $E_e$ and a surface $S_e$, the arrangement of the cords of the arrangements being such that $\Sigma(E_I \times S_I)_{int} > \Sigma(E_e \times S_e)_{ext}$.

According to this embodiment, the resultant internal rigidity is greater than the resultant external rigidity.

It should be noted that in the case of a multi-filament cable or a cable having multiple cords, the section considered is the effective section. The free or empty spaces between the cords are not considered.

Advantageously, the total of the products E×S is considered solely in the zone of the beads of the tire. Thus, if, for example, protective cords, often of textile type, are located in a portion of the sidewall and/or the crown, these cords will not be considered in the equation.

According to an advantageous variant, the value of $S_e$ is zero.

According to an advantageous variant of the invention, $\Sigma(E_I \times S_I)_{int}/\Sigma(E_e \times S_e)_{ext} > 1$.

According to another advantageous variant of the invention, $\Sigma(E_I \times S_I)_{int}/\Sigma(E_e \times S_e)_{ext} > 1.5$.

According to another advantageous variant of the invention, $\Sigma(E_I \times S_I)_{int}/\Sigma(E_e \times S_e)_{ext} > 10$.

It is known that in the current art the carcass ply or plies is/are turned up about a bead wire. The bead wire then performs the function of anchoring the carcass, that is to say, takes up the tension which develops in the carcass cords under the action of the inflation pressure. In the configurations described in the present application, the function of anchoring the reinforcement structure of the carcass type is also ensured.

It is also known, still in the prior art, that the same bead wire furthermore performs a function of clamping the bead on its rim. In the configurations described in the present application, the clamping function is also ensured, in particular by the windings of circumferential cords which are closest to the seat.

It will be understood that the invention can be used by adding other elements to the bead or to the bottom zone of the tire in general, as some variants will illustrate. Likewise, the invention can be used by multiplying the reinforcement structures of the same type, or even by adding another type of reinforcement structure.

In the present specification, the term "cord" very generally designates both monofilaments and multifilaments, or assemblies such as cables, plied yarns or alternatively any equivalent type of assembly, and this whatever the material and the treatment of these cords, for example surface treatment or coating or pre-sizing in order to promote adhesion to the rubber.

A reinforcement or reinforcing structure of the carcass type will be said to be radial when its cords are arranged at 90°, but also, according to the terminology in use, at an angle close to 90°.

In the present application, the term "main cord" indicates a cord of high modulus, namely for example 20,000 daN/mm$^2$ or more. Such a modulus may be achieved, for example, by a metallic-type cord, such as a steel wire.

BRIEF DESCRIPTION OF THE DRAWINGS

For a better understanding of the invention, reference may be made to the following description of exemplary embodiments thereof, taken in conjunction with the accompanying drawings, in which:

FIG. 3 is a radial section essentially showing a sidewall and a bead of another variant of the embodiment of FIG. 1;

FIG. 4 is a radial section essentially showing a sidewall and a bead of a second embodiment of a tire according to the invention;

DETAILED DESCRIPTION OF EXEMPLARY EMBODIMENTS

Figure 1:
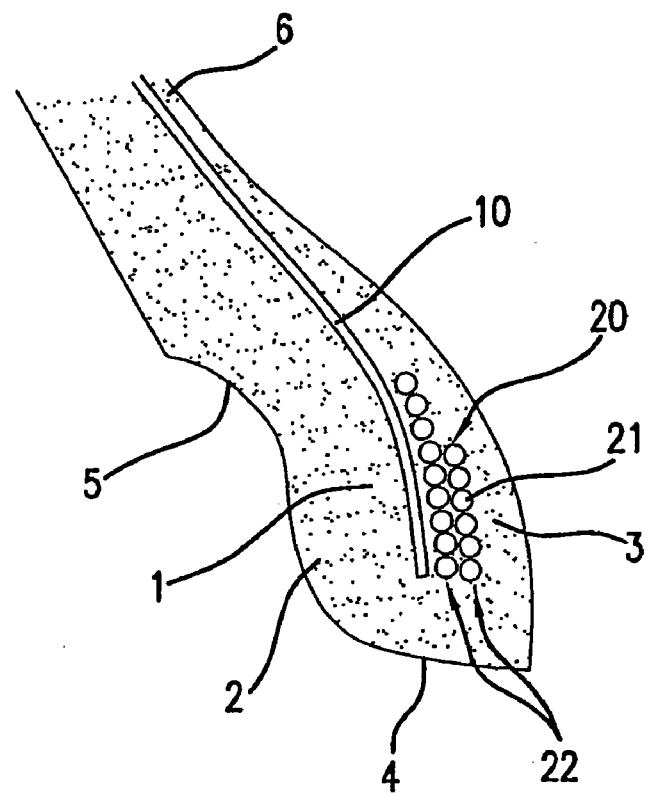
FIG. 1 is a radial section essentially showing a sidewall and a bead of a first embodiment of a tire according to the invention.
Figure 2:
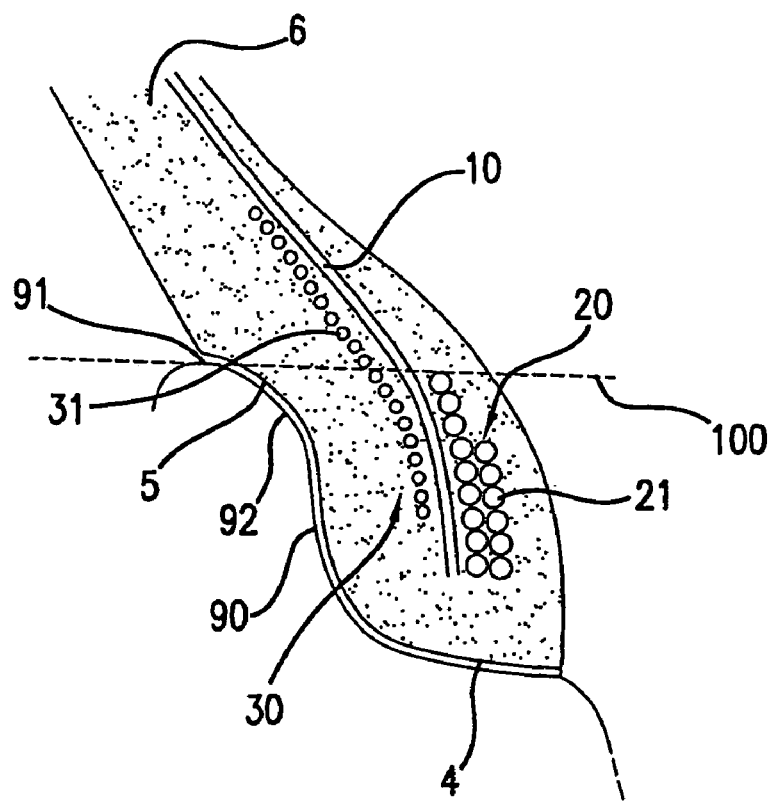
FIG. 2 is a radial section essentially showing a sidewall and a bead of a variant of the embodiment of FIG. 1.

FIG. 1 shows the bottom zone, in particular the bead 1, of a first embodiment of the tire according to the invention. The bead 1 comprises an axially outer portion 2 which is provided and shaped so as to be placed against the flange of a rim. The upper portion, or radially outer portion, of the portion 2 forms a portion 5 adapted to the rim hook. This portion is frequently curved axially towards the outside, as illustrated in FIGS. 1 and 2. The portion 2 ends radially and axially towards the inside in a bead seat 4 which is adapted to be placed against a rim seat. The bead also comprises an axially inner portion 3, which extends substantially radially from the seat 4 towards the sidewall 6.

The tire also comprises a reinforcement or reinforcing structure 10 of the carcass type provided with reinforcements which are advantageously shaped in a substantially radial arrangement. This structure may be arranged continuously from one bead to the other, passing through the sidewalls and the crown of the tire. Alternatively, it may comprise two or more parts, arranged for example along the sidewalls, without covering the entire crown.

In order to position the reinforcement cords as accurately as possible, it is very advantageous to build the tire on a rigid support, for example a rigid core which imposes the shape of its inner cavity. There are applied to this core, in the order required by the final architecture, all the constituents of the tire, which are arranged directly in their final position, without the profile of the tire having to be modified during building.

Circumferential cords 21, preferably arranged in the form of stacks 22, form an arrangement of main cords 20, which is provided in each of the beads. These cords are preferably metallic, and possibly brass-coated. In each stack 22, the cords are advantageously substantially concentric and superposed.

In order to ensure perfect anchoring of the reinforcement structure 10, a stratified composite bead 1 is produced. Within the bead 1, between the cord alignments of the reinforcement structure 10, there are arranged circumferentially oriented cords. These are arranged in a stack as in the drawings, or in a plurality of adjacent stacks, or in packets, or in any suitable arrangement, depending on the type of tire and/or the desired characteristics.

The radially inner end portions of the reinforcement structure 10 cooperate with the beads. There is thus effected anchoring of these inner end portions in the beads so as to ensure the integrity of the tire. In order to promote such anchoring, the space between the circumferential cords and the reinforcement structure is occupied by a connecting rubber mix. It is also possible to provide for the use of a plurality of mixes having different characteristics, defining a plurality of zones, the combinations of mixes and the resultant arrangements being virtually unlimited. However, it is advantageous to provide for the presence of a mix of high elasticity modulus in the zone of intersection between the arrangement of cords and the reinforcement structure. By way of non-limitative example, the elasticity modulus of such a mix may reach or even exceed 25 MPa, and even in some cases reach or even exceed 40 MPa.

The arrangements of cords may be arranged and manufactured in several ways. For example, a stack 22 may advantageously be formed of a single cord wound (substantially at zero degrees) in a spiral over several turns, preferably from the smallest diameter towards the largest diameter. A stack may also be formed of a plurality of concentric cords laid one within another, so that rings of gradually increasing diameter are superposed. It is not necessary to add a rubber mix to ensure the impregnation of the reinforcement cord, or circumferential windings of cord.

According to the invention, the main cords 21 are of priority arranged on the axially inner side of the bead. Thus, in the example of FIG. 1, the axially inner portion comprises an arrangement of main cords formed of two stacks 23 of juxtaposed cords. They are advantageously arranged in the immediate vicinity of the reinforcement structure 10. The structure illustrated in FIG. 1 is particularly simplified and simple to produce. The forces of the reinforcement structure 10 are transmitted to the zero-degree windings 21 by means of a mix having suitable characteristics.

This embodiment is well-suited in particular for tires of the passenger-vehicle type in general, or alternatively for tires having a high speed index of the passenger-car or two-wheeler type.

FIG. 2 illustrates a variant of the embodiment of FIG. 1, furthermore comprising an arrangement 30 of secondary cords 31, preferably of textile type. In this example, the arrangement of secondary cords is arranged in the axially outer portion 2 of the bead, along the reinforcement structure 10. The arrangement may advantageously be formed of a single cord wound (substantially at zero degrees) in a spiral, preferably from the smallest diameter towards the largest diameter. A stack may also be formed of a plurality of concentric cords laid one within another. The arrangement 30 of secondary cords 31 may be extended substantially radially along the sidewall or a portion thereof. Without departing from the scope of the invention, one or more arrangements of secondary cords could be provided within other zones of the tire.

The number of windings, the radial spacing and the radial position of the arrangements may vary in an infinite number of possibilities. These characteristics are defined according to the qualities desired at the bottom zone of the tire, such as rigidity, wear resistance, endurance, etc.

In this same figure, a rim 90 matched to the tire so as to permit mounting of the assembly is also illustrated. The point 91 which is the outermost point of the hook 92 of this rim is advantageously used as a delimitation for the limiting radial position of the main cords 21 of the anchoring zone. It can thus be seen that the main cords 21 are arranged radially internally to the corresponding line 100.

FIG. 3 illustrates another variant of the embodiment of FIG. 1, which differs slightly from that shown in FIG. 2. For example, the arrangement 30 of the secondary cords 31 extends substantially radially from the base of the reinforcement structure 10. The arrangements 20 of main cords 21 are substantially similar and parallel, and the stacks 22 are of the same height.

FIG. 4 shows a second embodiment of the invention in which arrangements 20 of main cords 21, advantageously of the cabled or unitary cord type, are provided on either side of the reinforcement structure 10. However, the number of main cords 21 arranged in the axially inner portion 3 is greater than the number of main cords 21 arranged in the axially outer portion 2.

In the different examples shown, the axially inner portion 3 and the axially outer portion 2 are advantageously defined by the carcass-type structure 10.

Advantageously, the number of main cords 21 arranged in the axially inner portion 3 is at least 1.5 times greater, and preferably two or more times greater, than the number of main cords 21 arranged in the axially outer portion 2.

In the example illustrated in FIG. 4, the number of main cords 21 arranged in the axially inner portion 3 is more than two times greater than the number of main cords 21 arranged in the axially outer portion 2.

Furthermore, in the example of FIG. 4, the arrangements 20 of cords 21 and the substantially adjacent portion of the reinforcement structure 10 are advantageously arranged in a zone of mix of high modulus 40. Such a zone promotes anchoring in the bead of the reinforcement structure. This example is well-suited in particular for a tire for a van or light truck, for which good rigidity in the bottom zone is desired.

Figure 5:
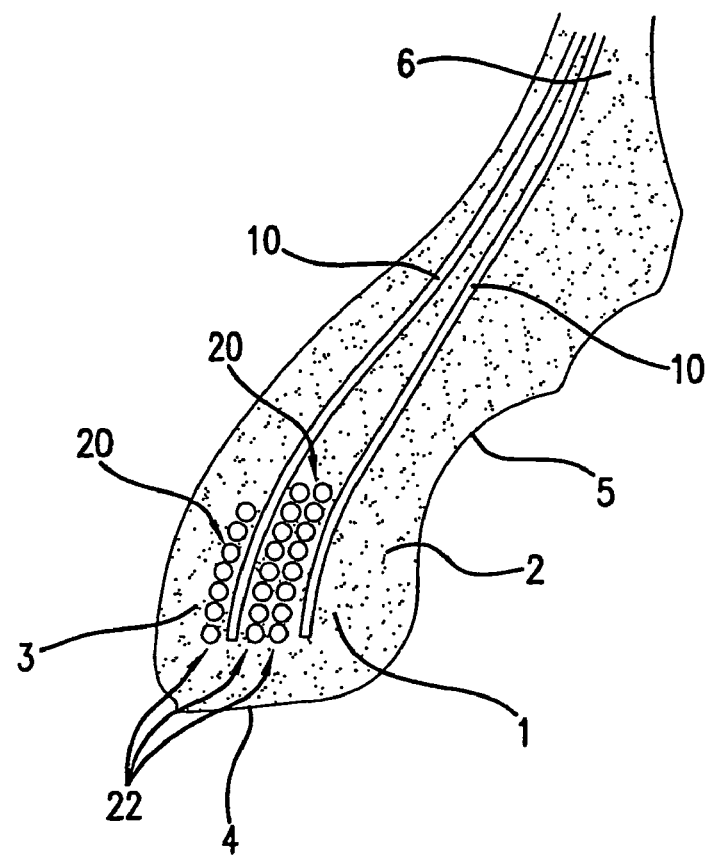
FIG. 5 is a radial section essentially showing a sidewall and a bead of another embodiment of a tire according to the invention.

FIG. 5 shows an example of another embodiment of the tire according to the invention. This embodiment is distinguished from the previous one mainly by the fact that the reinforcement structure 10 is double at least at the level of the bottom zone of the tire. Such a configuration involves two main families of tires, namely the one comprising two reinforcement structures and the one comprising a single reinforcement structure, but a portion of the latter being doubled, for example in the bottom zone of the tire. Usually, but not obligatorily, one or more stacks 22 of main or secondary cords are found between the portions of reinforcement structure 10.

Within the scope of the present invention, when the respective numbers of cords on either side of the reinforcement structure are compared, the reinforcement structure is considered as a whole, such that any stacks of cords present between portions of reinforcement structure are assimilated into the structure and therefore do not form part of the comparison of the numbers of cords.

In the example of FIG. 5, the number of main cords 21 arranged in the axially inner portion 3 is greater than the number of main cords 21 arranged in the axially outer portion 2. In fact, there is a stack 22 of seven cords in the inner portion, while there is no cord in the outer portion. The end portion of the carcass reinforcement shown in FIG. 5 has a substantially radial meridian profile.

Figure 13:
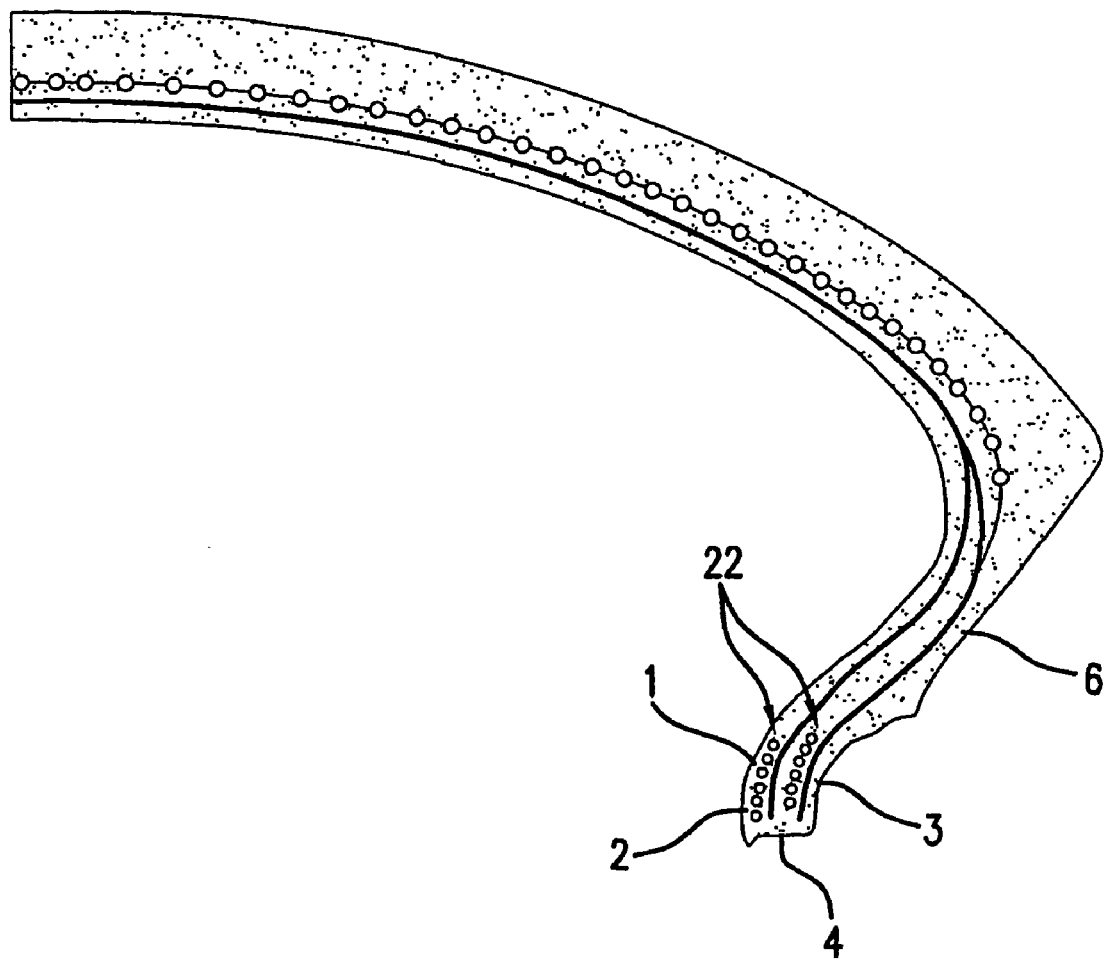
FIG. 13 is a radial section essentially showing half a tire of another variant of the embodiment of FIG. 5.

FIG. 13 illustrates a variant of the embodiment shown in FIG. 5 comprising only one stack 22 in the central portion.

Figure 6:
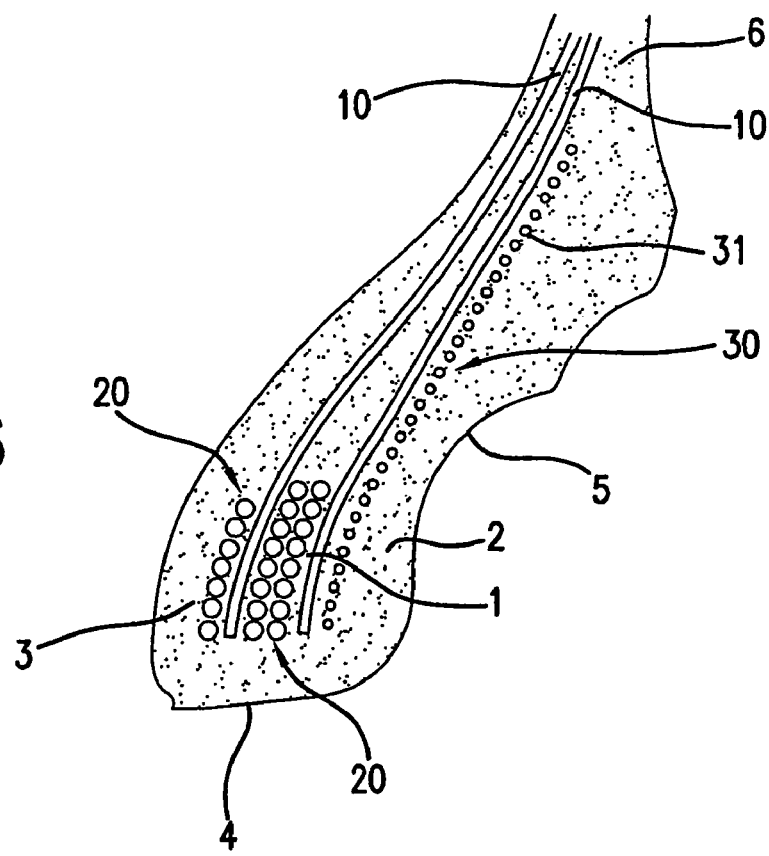
FIG. 6 is a radial section essentially showing a sidewall and a bead of a variant of the embodiment of FIG. 5.

FIG. 6 shows a variant of the embodiment of FIG. 5, comprising an arrangement 30 of secondary cords 31 which is arranged in the outer portion 2 of the bead and extends even radially externally beyond the bead. This arrangement contributes to the transverse rigidity of the tire. The cords are advantageously made of aramid, hybrid, PET or PEN. As a variant, part or all of the main cords 20 which are arranged between the portions of reinforcement structure 10 could be replaced by secondary cords, for example textile ones. This example is well-suited in particular to tires of the passenger-car, van or light-truck and two-wheeler types.

Figure 7:
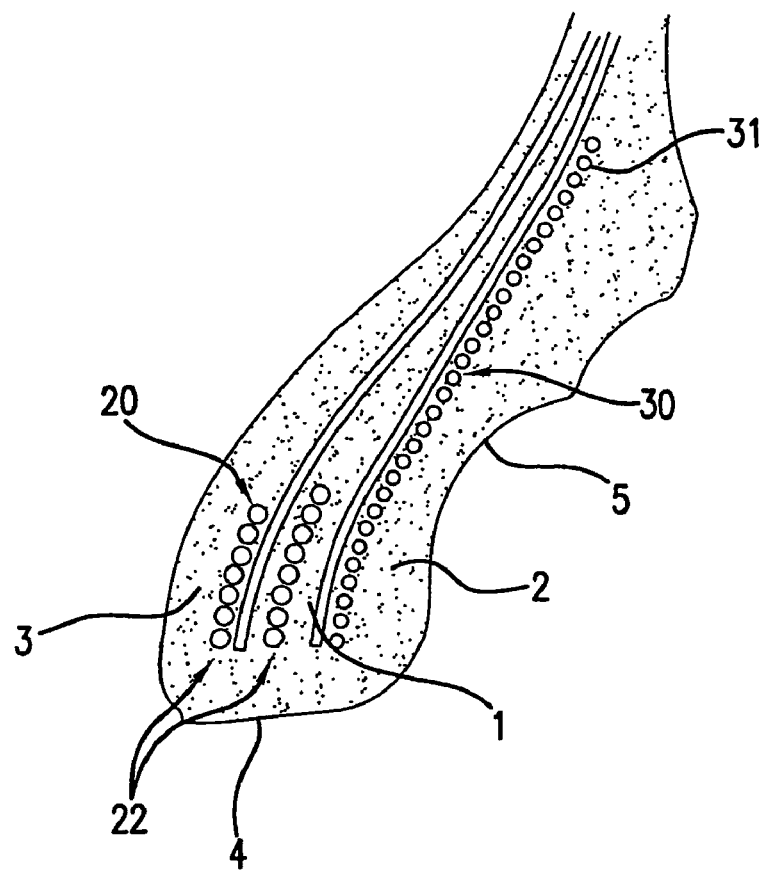
FIG. 7 is a radial section essentially showing a sidewall and a bead of a variant of the embodiment of FIG. 6.
Figure 8:
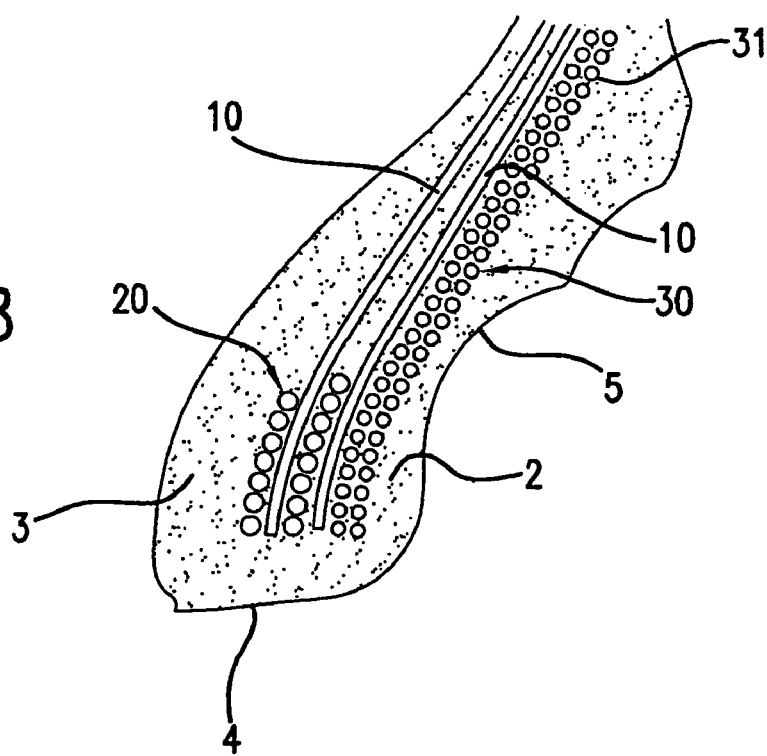
FIG. 8 is a radial section essentially showing a sidewall and a bead of another variant of the embodiment of FIG. 6.

FIGS. 7 and 8 illustrate variants of the example of FIG. 6. In FIG. 7, for example, a single stack 22 of main cords is located between the two structure portions. Alternatively, an arrangement 30 of secondary cords 31 comprising two stacks side by side is shown in FIG. 8. The arrangements of secondary cords 31, preferably of the textile type, provide greater lateral and longitudinal rigidity. The stacks of cords 31 of these arrangements 30 extend substantially radially from the bead to the sidewall, beyond the rim hook 5.

Figure 9:
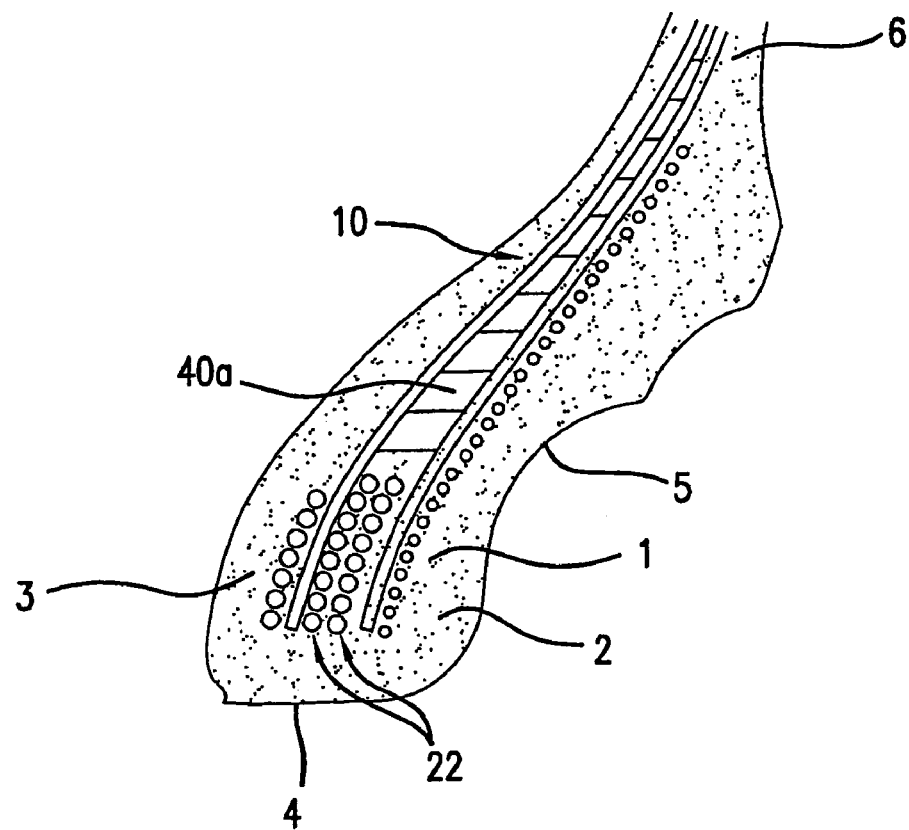
FIG. 9 is a radial section essentially showing a sidewall and a bead of another variant of the embodiment of FIG. 6.
Figure 10:
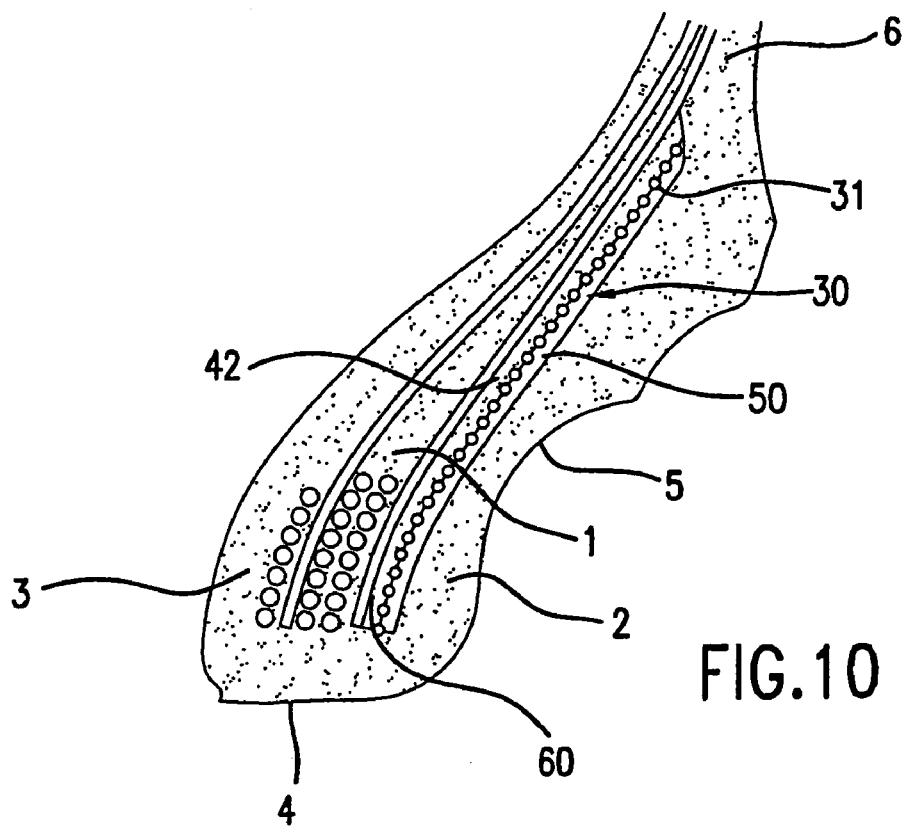
FIG. 10 is a radial section essentially showing a sidewall and a bead of another variant of the embodiment of FIG. 6.

FIGS. 9 and 10 illustrate other variants of the example of FIG. 6. The variant of FIG. 9 comprises a zone of rubber mix of high modulus 40a arranged on at least one portion of the path of the two portions of reinforcement structure 10, i.e., between these two portions. In the example illustrated, the zone in question does not cover the stacks 22 of cords which are arranged between the portions of the structure 10. According to another variant (not shown), the zone also covers these stacks 22 of cords. The presence of this high-modulus zone contributes to increasing the rigidity of the bottom zone of the tire.

This mix 40a is advantageously arranged so as to be in direct contact with the adjacent portions of the reinforcement structure 10. In the traditional configurations, a carcass ply (impregnated cord in a layer of rubber mix) is applied. There therefore results a thin intermediate layer of mix of lower modulus which is located between the mix of high modulus and the portion of reinforcement structure. With direct contact, i.e., without the presence of this thin layer of mix of lower modulus, the impact of the presence of the mix of high modulus in the zone 40a is amplified. In fact, the traditional thin layer of lower modulus causes loss of energy, which may cause deterioration of the mechanical properties.

By modifying the thickness of the zone 40a and/or by using a mix with a more or less high modulus, a tire with the desired rigidity, suited for the intended use, can be obtained. This example is well-suited to tires of the passenger-car, van or light-truck and two-wheeler types.

FIG. 10 shows a variant in which the arrangement 30 of secondary cords 31 is arranged in a zone comprising different sub-zones each having distinct mechanical properties, in particular different elasticity moduli.

For example, the zone 42 is of high modulus (such as, for example, greater than 12 MPa), the zone 60 is of very high modulus (such as, for example, greater than or equal to 25 MPa), and the zone 50 is of lower modulus (such as, for example, less than or equal to 12 MPa).

By thus refining the distribution of the zones, it is possible to optimize the characteristics of the bead 1 by taking into account the different demands for each of the zones; for example, maximum hardness and rigidity at the base of the bead, then greater flexibility from the rim hook onwards.

Starting from these few examples, other arrangements may be proposed, for example, one variant having simultaneously the zones of high modulus of FIGS. 9 and 10.

Figure 11:
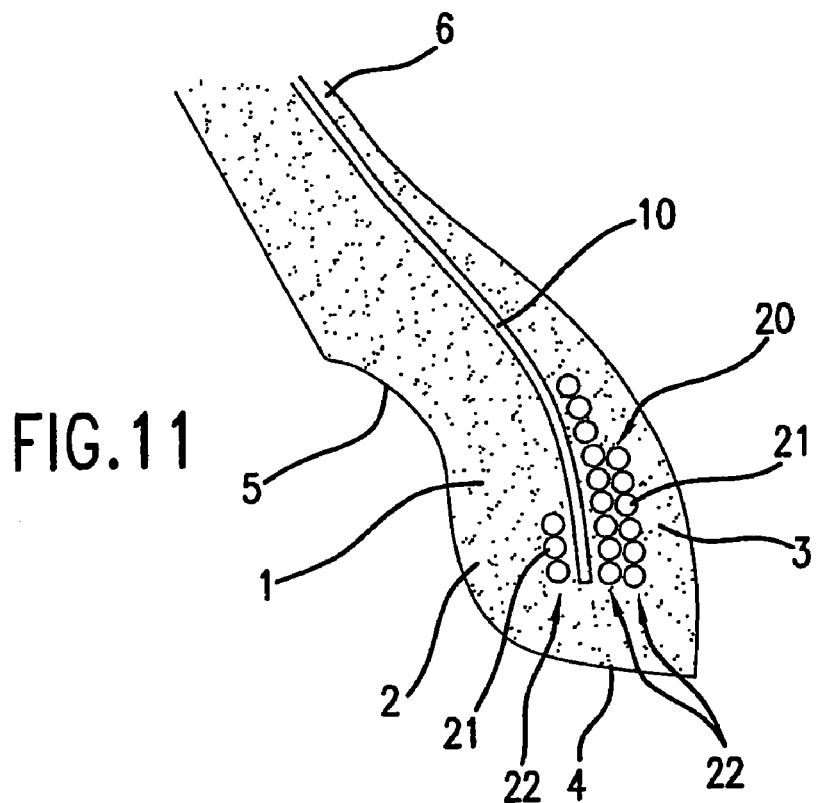
FIG. 11 is a radial section essentially showing a sidewall and a bead of another embodiment of a tire according to the invention.
Figure 12:
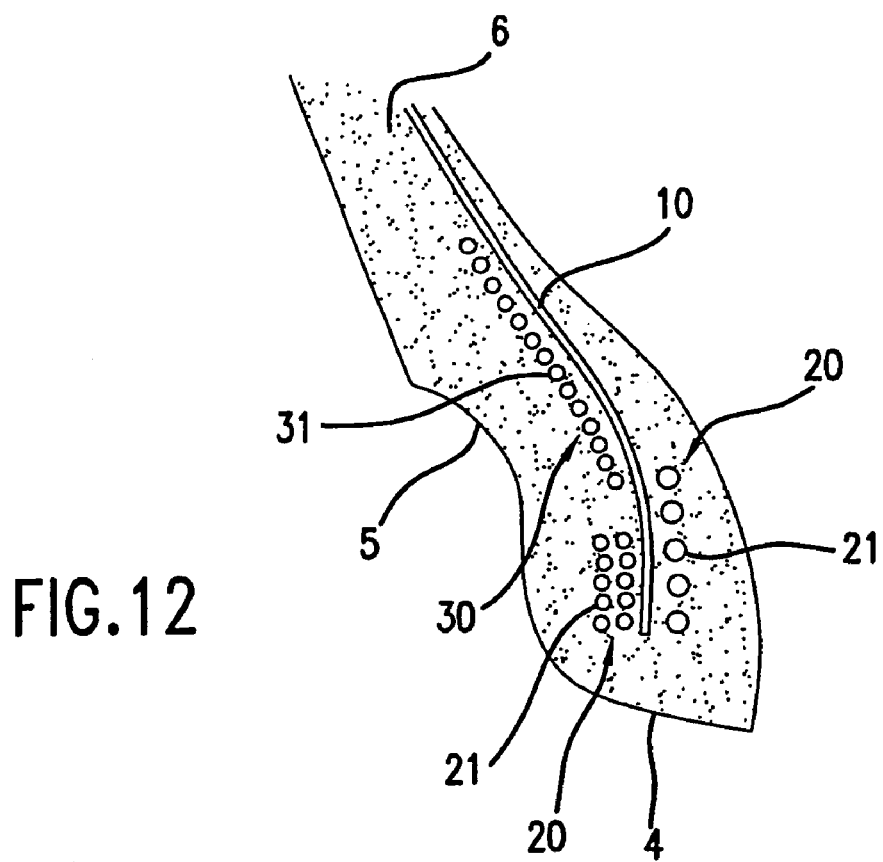
FIG. 12 is a radial section essentially showing a sidewall and a bead of a variant of the embodiment of FIG. 11, comprising primary cords of different diameters.

FIGS. 11 and 12 illustrate examples of another embodiment of a tire according to the invention. In this embodiment, on either side of the reinforcement structure 10 there are arrangements 20 of main cords 21 of different diameters. According to the invention, the arrangement of the cords of the arrangements 20 is such that the surface density of the main cords 21 arranged on the axially inner side 3 relative to the structure 10 is greater than the surface density of the main cords 21 arranged on the axially outer side 2 relative to the structure 10. In the example of FIG. 12, this latter criterion is met even if the number of main cords 21 on the axially inner side 3 is less than the number of main cords 21 of the axially outer side 2. According to an advantageous example, the surface density corresponds to the total of the surfaces of the cord profiles (cut cords or filaments or cables or plied yarns). For example, a restricted number of cords of large diameter may occupy a larger surface than a larger number of cords or cables or filaments or twisted yarns, etc, of generally smaller diameters. The total of the surfaces is important: it may be a total of identical or non-identical surfaces.

In the different examples described and illustrated, there is at least one arrangement of cords along a substantially circumferential path arranged substantially adjacent to the reinforcement structure, the arrangement of the cords of said arrangements being such that $\Sigma(E_I \times S_I)_{int} > \Sigma(E_e \times S_e)_{ext}$, in which $E_I$ and $S_I$ represent respectively the Young's modulus and the surface of each cord arranged on the axially inner side relative to said structure, and in which $E_e$ and $S_e$ represent respectively the Young's modulus and the surface of each cord arranged on the axially outer surface relative to said reinforcement structure. The total of the products of the moduli and the effective surfaces of each of the cords on either side of the reinforcement structure constitutes a reliable, accurate measurement and comparison parameter. Advantageously, this formulation furthermore makes it possible to take into account in the comparison any type of cord or filament or cable. Preferably the comparison is effected from cords arranged in the zone of the bead or in the anchoring zone of the reinforcement structure in the bead.

What is claimed is:

1. A tire, comprising at least one reinforcement structure anchored on either side of the tire in a bead, the base of which bead is intended to be mounted on a rim seat of a standard rim for the tire, each bead being extended radially towards the outside by a sidewall and comprising a zone of axial bearing extending substantially between the base of the bead and a radial position of the bead substantially corresponding to the position of the radially outer edge of a hook of the rim, the sidewalls radially towards the outside joining a tread, on the circumference of the tire the at least one reinforcement structure extending from an end portion of said structure, arranged in the bead, towards said sidewall, at least in the end portion said at least one structure being axially separated into at least two portions, at least one arrangement of main cord windings along a substantially circumferential path being arranged substantially adjacent to at least one of the portions of said at least one structure so as to form an anchoring zone, the main cord windings anchoring the at least one reinforcement structure in the bead and/or clamping the bead, the arrangement of the main cord windings of said at least one arrangement being such that the surface density of main cord windings arranged on the axially inner side relative to said at least one structure is greater than the surface density of main cord windings arranged on the axially outer side relative to said at least one structure, all of said main cord windings having a radial position not extending beyond said zone of axial bearing.

2. A tire according to claim 1, in which all of the arrangements of main cord windings are on the axially inner side relative to said at least one structure.

3. A tire according to claim 1, also comprising at least one arrangement of secondary cord windings which are arranged axially to the outside relative to said at least one reinforcement structure.

4. A tire according to claim 3, in which the secondary cords are non-metallic.

5. A tire according to claim 3, in which the main cords have a high elasticity modulus.

6. A tire according to claim 3, in which the at least one arrangement of secondary cord windings is arranged so as to be in contact with at least one rubber mix of high modulus.

7. A tire according to claim 1, in which at least one portion of the main cord windings and the structure portion in the immediate vicinity of said cord windings are embedded in a rubber mix of a modulus greater than 25 MPa.

8. A tire according to claim 7, in which the modulus is greater than 40 MPa.

9. A tire according to claim 1, in which the at least one reinforcement structure comprises, at the level of the bead, at least two axially spaced structure portions, with the interposition of an arrangement of cord windings between at least two of the adjacent portions.

10. A tire according to claim 1, in which the at least one arrangement of cord windings is surrounded on one side by a first rubber mix and on the other side by a second rubber mix which is different from the first mix.

11. A tire according to claim 1, in which said end portion of the at least one structure has a substantially radial meridian profile.

* * * * *